US011947748B2

(12) United States Patent
Fang

(10) Patent No.: US 11,947,748 B2
(45) Date of Patent: Apr. 2, 2024

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Liang Fang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/261,018

(22) PCT Filed: Oct. 26, 2020

(86) PCT No.: PCT/CN2020/123509
§ 371 (c)(1),
(2) Date: Jan. 17, 2021

(87) PCT Pub. No.: WO2022/047942
PCT Pub. Date: Mar. 10, 2022

(65) Prior Publication Data
US 2023/0289001 A1    Sep. 14, 2023

(30) Foreign Application Priority Data

Sep. 7, 2020  (CN) .......................... 202010927329.8

(51) Int. Cl.
*G09G 5/00*     (2006.01)
*G06F 3/041*    (2006.01)

(52) U.S. Cl.
CPC ........ *G06F 3/0412* (2013.01); *G06F 3/04164* (2019.05)

(58) Field of Classification Search
CPC .. G06F 3/0412; G06F 1/3262; G06F 3/04164; G06F 3/047
USPC ......................................................... 345/173
See application file for complete search history.

(56) References Cited

U.S. PATENT DOCUMENTS

2015/0287381 A1    10/2015  Kim et al.
2019/0377445 A1*   12/2019  Jeong .................... G06F 3/0446
2020/0111843 A1*    4/2020  Han ...................... G06F 3/0412
(Continued)

FOREIGN PATENT DOCUMENTS

CN    106249977 A    12/2016
CN    108446057 A    8/2018
CN    108803164 A    11/2018
(Continued)

*Primary Examiner* — Jennifer T Nguyen
(74) *Attorney, Agent, or Firm* — PV IP PC; Wei Te Chung; Zhigang Ma

(57) ABSTRACT

A display panel and a display device are provided. Each of touch trace regions is individually wired to connect to a touch integrated circuit, and it is not necessary for all the touch trace regions to be converged in a lower border region. Moreover, the touch trace regions are respectively arranged above a low-voltage trace region VSS and a high-voltage trace region VDD, so that a width of left and right lower border regions can be reduced, which is beneficial to a narrow down border design of large-sized display panels.

20 Claims, 4 Drawing Sheets

(56) References Cited

U.S. PATENT DOCUMENTS

2021/0118958 A1* 4/2021 Park .................. H01L 27/124
2021/0357059 A1* 11/2021 Fang .................. G06F 3/0412

FOREIGN PATENT DOCUMENTS

| CN | 109656410 A | 4/2019 |
| CN | 109656412 A | 4/2019 |
| CN | 109917962 A | 6/2019 |
| CN | 111290662 A | 6/2020 |
| CN | 111427475 A | 7/2020 |
| CN | 111427476 A | 7/2020 |

* cited by examiner

DISPLAY PANEL AND DISPLAY DEVICE

FIELD OF INVENTION

The present invention relates to the field of display technologies, and in particular to a display panel and a display device with an ultra-narrow border.

BACKGROUND OF INVENTION

Current display device technologies mainly include liquid crystal displays, plasma display panels, organic electroluminescence, and active matrix organic electroluminescence, which have broad application field in vehicles, mobile phones, tablets, computers, and TV products. Touch function has become one of the standard configurations of many display devices. Among them, capacitive touch screens are widely used. Basic principle is to use tools such as fingers or stylus to generate capacitance with a touch screen, and using an electrical signal formed by a capacitance change before and after a touch to confirm whether a panel is touched and obtaining touch coordinates.

SUMMARY

Technical Problem

An important touch technology of capacitive touch panels is self-capacitive, as shown in FIG. 1 which is a schematic diagram of a common touch structure design. Touch signal lines 10 are converged in a lower border region 11. In order to reduce signal interference, the signal lines are all arranged above a corresponding region of cathode driving signal line 12 (VSS). The touch signal lines 10 have a width after being converged, and a lower outer border region has a certain width. As a size of a display device is increased, corresponding touch signal lines 10 are increased, and a width (horizontally and vertically) of a signal line converging region 13 is increased, resulting in an increase in widths of the lower border region 11 and a bending region, which is not conducive to a narrow down border design, and more room is needed for production of display devices, affecting an output rate of the panel.

Therefore, it is necessary to provide a display panel with an ultra-narrow border to solve a problem of greater border width in a conventional art.

SOLUTION TO TECHNICAL PROBLEM

Technical Solutions

An objective of the present invention is to provide a display panel that reduces a trace width of a border region to achieve a narrow border.

The present invention provides a display panel, including a display region and a border region, the border region including a lower border region, wherein the lower border region is positioned on a lower side of the display region, a bending region is arranged on a side of the lower border region away from the display region; wherein the display region includes a plurality of touch sensing chains arranged longitudinally, and each of the touch sensing chains includes a plurality of touch sensing blocks arranged longitudinally; wherein each of the touch sensing chains leads out at least one touch trace region, the at least one touch trace region is arranged on a left side or a right side of each of the touch sensing chains, each of the at least one touch trace region extends longitudinally to the lower border region and is converged to form a trace-crossing region, and the trace-crossing region passes through the lower border region and the bending region to connect to a touch integrated circuit; wherein the lower border region includes a low-voltage trace region and a high-voltage trace region; and wherein the trace-crossing region is arranged above the low-voltage trace region and the high-voltage trace region, respectively.

Furthermore, a lateral width corresponding to each of the at least one touch trace region is less than a lateral width of the low-voltage trace region and the high-voltage trace region, and/or, a layout pattern of the trace-crossing region corresponds to a pattern of the high-voltage trace region.

Furthermore, each of the touch sensing blocks leads out at least one touch signal line, the at least one touch signal line forms the at least one touch trace region, and in the at least one touch trace region, the at least one touch signal line extends longitudinally to the lower border region and is converged in the lower border region.

Furthermore, the display panel further including a center line, the center line being parallel to the touch sensing chains, wherein the border region further includes a left border region and a right border region, the left border region is positioned on a left side of the display region, and the right border region is positioned on a right side of the display region, the at least one touch trace region corresponding to one of the touch sensing chains positioned on the leftmost side of the center line is arranged in the left border region, and the at least one touch trace region corresponding to one of the touch sensing chains positioned on the rightmost side of the center line is arranged in the right border region.

Furthermore, the at least one touch signal line of the left border region and the at least one touch signal line of the right border region extend downward to the lower border region, and are converged in the lower border region to form a first trace-crossing region, and the first trace-crossing region is arranged above the low-voltage trace region.

Furthermore, the at least one touch signal line in the at least one touch trace region is symmetrical about the center line in the display region, on a left side of the center line, the at least one touch trace region corresponding to the touch sensing chains is arranged on a left side of the touch sensing chains, and on a right side of the center line, the at least one touch trace region corresponding to the touch sensing chains is arranged on a right side of the touch sensing chains.

Furthermore, the at least one touch trace region of the display region extends longitudinally to the lower border region and is converged in the lower border region to form a second trace-crossing region, and the second trace-crossing region is arranged above the high-voltage trace region.

Furthermore, the high-voltage trace region includes at least one square portion and at least two bumps, and the bumps are positioned on a side of the square portion away from the display region, and wherein in the display region, each of the at least one touch trace region extends longitudinally to the lower border region and is converged in the lower border region to form a third trace-crossing region and a fourth trace-crossing region, the third trace-crossing region and the fourth trace-crossing region pass through the lower border region and are connected to the touch integrated circuit, a predetermined gap is defined between the third trace-crossing region and the fourth trace-crossing region, and the third trace-crossing region and the fourth trace-crossing region are arranged above the bumps in parallel to each other.

Furthermore, the first trace-crossing region includes a straight line portion, the second trace-crossing region includes a corner, and the corner faces the first trace-crossing region.

Furthermore, the at least one touch signal line includes a horizontal section and a vertical section, the at least one touch signal line in the display region is not intersected with each other, the vertical section is vertically connected to the horizontal section, and the vertical section extends from the at least one touch trace region to the lower border region.

The present invention further provides a display device, which includes the above-mentioned display panel.

ADVANTAGES OF INVENTION

Beneficial Effect

The beneficial effects of the present application are as follows. The present invention provides a display panel and a display device, each of the touch trace region is individually wired to connect to the touch integrated circuit, and it is not necessary for all the touch trace regions to be converged in the lower border region. Moreover, the touch trace regions are respectively arranged above the low-voltage trace region VSS and the high-voltage trace region VDD, so that the width of the left and right lower border regions can be reduced, which is beneficial to a narrow down border design of large-sized display panels, and because VDD and VSS are both direct current (DC) signal sources, direct current signal cannot pass through a capacitor and will not cause crosstalk to the signal line. Therefore, the present invention can also reduce an influence on a signal crosstalk.

BRIEF DESCRIPTION OF FIGURES

Description of Drawings

The following describes the specific embodiments of the present application in detail with reference to the accompanying drawings, which will make the technical solutions and other beneficial effects of the present application obvious.

Figure 1:
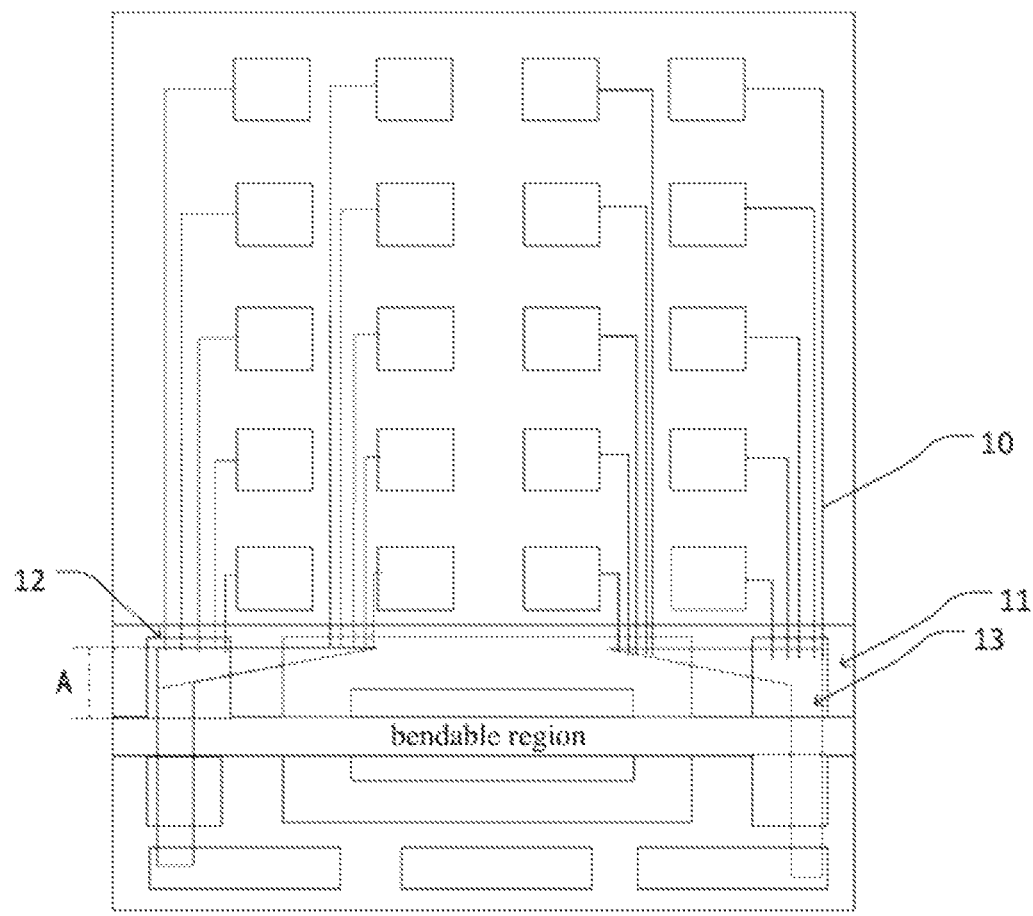

FIG. 1 is a plane view of a conventional art display panel.

Figure 2:
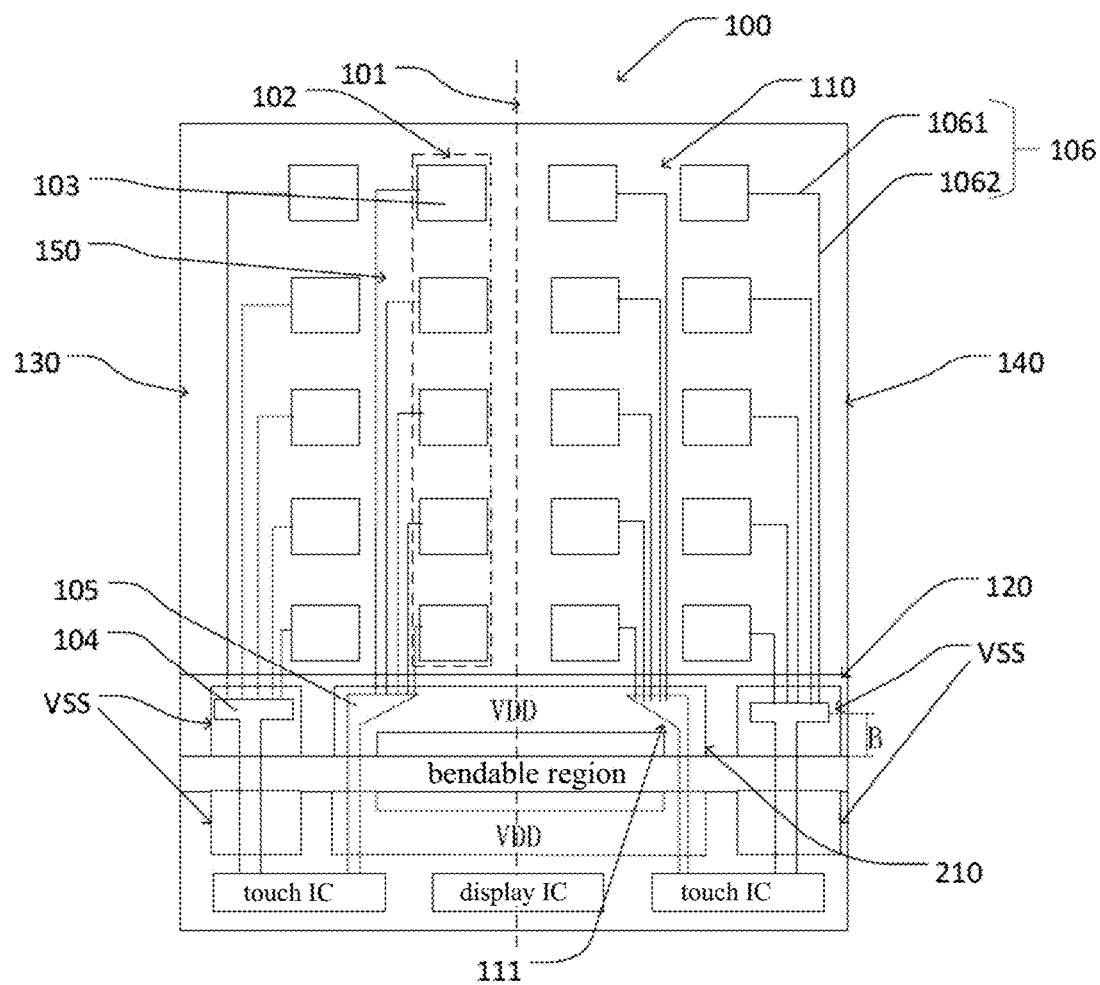

FIG. 2 is a schematic plane view of a display panel according to a first embodiment of the present invention.

Figure 3:
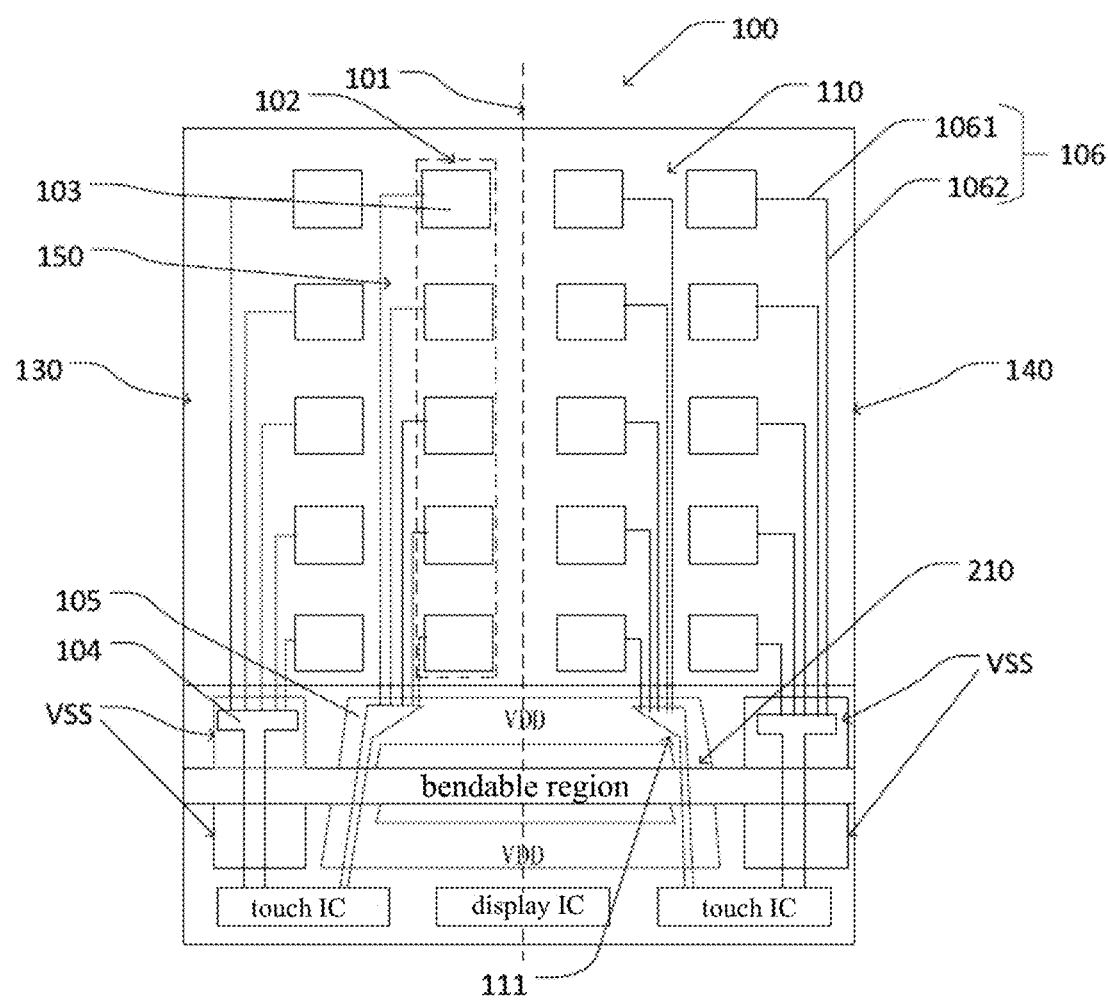

FIG. 3 is another schematic plane view of the display panel according to the first embodiment of the present invention.

Figure 4:
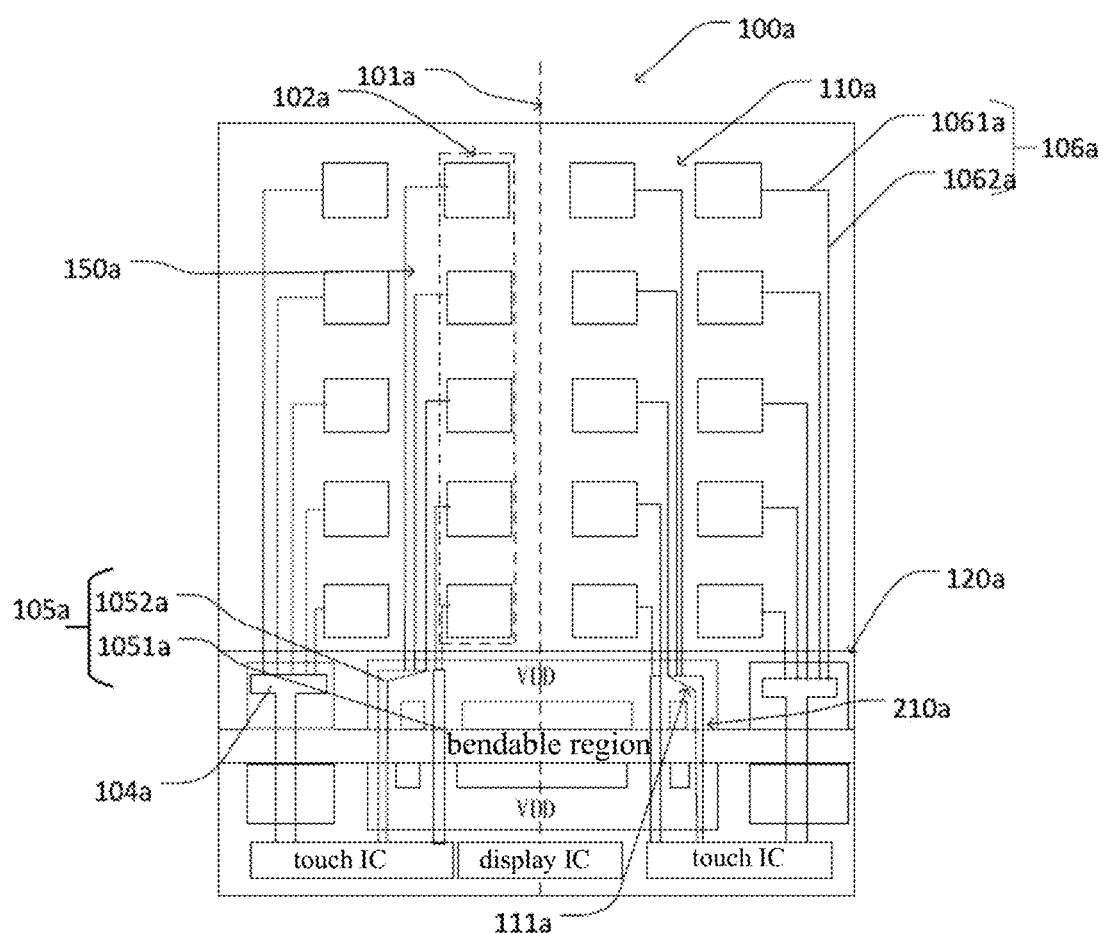

FIG. 4 is a schematic plane view of a display panel according to a second embodiment of the present invention.

display panel 100;
center line 101; display region 110; left border region 130; right border region 140; lower border region 120; touch sensing chain 102;
touch trace region 150; touch signal line 106; first trace-crossing region 104;
horizontal section 1061; vertical section 1062; second trace-crossing region 105.

EMBODIMENTS OF INVENTION

Detailed Description of Embodiments

The specific structure and functional details disclosed herein are only representative, and are used for the purpose of describing exemplary embodiments of the present application. However, the present application can be implemented in many alternative forms, and should not be interpreted as being limited to the embodiments set forth herein.

In the description of the present application, it is to be understood that the terms such as "center", "lateral", "upper", "lower", "left", "right", "vertical", "horizontal", "top", "bottom", "inside", "outside", etc., the orientation or positional relationship of the indications is based on the orientation or positional relationship shown in the drawings, and is merely for the convenience of the description of the invention and the simplified description, rather than indicating or implying that the device or component referred to has a specific orientation, in a specific orientation. The construction and operation are therefore not to be construed as limiting the invention. In addition, unless otherwise defined, any technical or scientific term used herein shall have the common meaning understood by a person of ordinary skills. Such words as "first" and "second" used in the specification and claims are merely used to differentiate different components rather than to represent any order, number or importance. In the description of the present invention, the meaning of "plurality" is two or more unless specifically defined otherwise. In addition, the term "including" and any variations thereof is intended to cover non-exclusive inclusion.

As shown in FIG. 2, a first embodiment of the present invention provides a display panel 100, which includes a center line 101, a display region 110, and a border region. The display panel 100 is symmetrical about the center line 101.

The border region includes a left border region 130, a right border region 140, and a lower border region 120. A bending region is arranged on a side of the lower border region 120 away from the display region 110.

In the present embodiment, the bending region has a bendable region, and the bending region is connected to the lower border region through the bendable region.

The lower border region 120 and the bending region both include a low-voltage trace region (VSS) and a high-voltage trace region (VDD).

The low-voltage trace region of the bending region is connected to the low-voltage trace region of the lower border region 120, and the high-voltage trace region of the bending region is connected to the high-voltage trace region of the lower border region 120.

The low-voltage trace region is arranged on both sides of the high-voltage trace region, and a gap is defined between the low-voltage trace region and the high-voltage trace region.

In an embodiment, in the bending region, the display panel 100 further includes a display integrated circuit and a touch integrated circuit, and the touch integrated circuit is disposed on a left and a right side of the display integrated circuit.

The display region 110 includes a plurality of touch sensing chains 102 arranged longitudinally, each of the touch sensing chains 102 includes a plurality of touch sensing blocks 103 arranged longitudinally, and the touch sensing chains 102 are arranged parallel to the center line.

Wherein, each of the touch sensing chains 102 leads to at least one touch trace region 150, the at least one touch trace region 150 is arranged on a left side or a right side of each of the touch sensing chains 102.

Each of the touch trace region 150 extends longitudinally to the lower border region 120 and is converged to form a trace-crossing region, and the trace-crossing region passes through the lower border region 120 to the bending region and is connected to the touch integrated circuit. The lower border region 120 is arranged between the bending region and the display region 110.

In the present embodiment, all the touch trace regions 150 do not need to be converged in the lower border region 120 (specifically above the VSS region), and each of the touch trace region 150 is individually wired to connect to the touch integrated circuit, so that a width of the lower border region 120 can be reduced, which is beneficial to narrowing down a border of large-sized display panel.

Moreover, because VDD and VSS are both direct current (DC) signal sources, parallel plate capacitors will be formed (characteristic of capacitor is "passing alternating current, blocking direct current"), direct current signal cannot pass through a capacitor; however, the alternating current signal may cause crosstalk to the signal line through the capacitor. Therefore, the present invention can also reduce an influence on a signal crosstalk.

In an embodiment, each of the touch trace region 150 is respectively disposed above the low-voltage trace region VSS and the high-voltage trace region VDD. That is, a lateral width corresponding to each of the touch trace region 150 must be less than a lateral width of the low-voltage trace region VDD or the high-voltage trace region VSS.

Each of the touch sensing blocks 103 leads out at least one touch signal line 106, and the touch signal line 106 forms the touch trace region 150. In the display region 110, the touch signal line 106 of each of the touch trace regions 150 is symmetrical about the center line 101.

For example, on a left side of the center line 101, the touch trace region 150 corresponding to the touch sensing chains 102 is arranged on a left side of the touch sensing chains 102, and on a right side of the center line 101, the touch trace region 150 corresponding to the touch sensing chains 102 is arranged on a right side of the touch sensing chains 102.

In more detail, the touch trace region 150 corresponding to one of the touch sensing chains 102 positioned on the leftmost side of the center line 101 is arranged in the left border region 130.

The touch trace region 150 corresponding to one of the touch sensing chains 102 positioned on the rightmost side of the center line 101 is arranged in the right border region 140.

The touch signal lines 106 of the left border region 130 and the right border region 140 extend downward to the lower border region 120 and are converged in the lower border region 120, and the converged touch signal lines 106 are arranged above the low-voltage trace region (VSS) (including the lower border region 120 and the VDD and VSS regions of the bending region). The touch signal lines 106 form a first trace-crossing region 104, as a T-shaped pattern shown in FIG. 2.

The touch trace region 150 of the display region 110 extends longitudinally to the lower border region 120 and is converged in the lower border region 120 to form a second trace-crossing region 105, and the second trace-crossing region 105 is arranged above the high-voltage trace region VDD.

In the display region 110, on the left side of the center line 101, the touch trace region 150 corresponding to the touch sensing chains 102 is arranged on the left side of the touch sensing chains 102.

In the display region 110, on the right side of the center line 101, the touch trace region 150 corresponding to the touch sensing chains 102 is arranged on the right side of the touch sensing chains 102.

In the display region 110, the touch signal lines 106 of the touch trace region 150 extend longitudinally to the lower border region 120 and are converged in the lower border region 120 to form the second trace-crossing region 105.

The second trace-crossing region 105 is arranged above the lower border region 120 and the VDD and VSS regions of the bending region.

A layout pattern of the touch trace region 150 is related to patterns of the VDD and VSS regions of the lower border region 120.

Specifically, as shown in FIG. 2, a layout pattern of the trace-crossing region 105 corresponds to the patterns of the VDD and VSS regions of the bending region.

In an embodiment, there is no bump pattern 210 in the VSS region, so the trace region positioned on the VSS region does not adopt a multi-section design. The VDD region has a bump pattern, and a trace of the touch trace region 150 of the display region 110 should be divided into two sections and concentrated in a region of the bump pattern 210, so a sectioned design is performed along the both sides of the center line.

In an embodiment, as shown in FIG. 3, the bump pattern 210 in the VDD region is not longitudinally vertical, but is a slanted pattern. Therefore, the layout pattern of the trace-crossing region 105 is also a slanted pattern, that is, there should be an oblique angle when routing, and the trace-crossing region 105 adopts an oblique design.

The touch signal line 106 is connected to both sides (left or right) of the touch sensing blocks 103. Material of the touch signal line 106 includes copper.

In other embodiments, in the display region 110 and the border regions on both sides, the touch trace region 150 corresponding to the touch sensing chains 102 is arranged on both sides (left or right) of each of the touch sensing chains 102. Specifically, on one of the touch sensing chains 102 (touch sensing chain 102 refers to a vertical dotted line frame with a touch sensing block 103 at one end), a portion of the touch sensing block 103 leads out the touch signal line from the left side 106. Another portion of the touch sensing block 103 leads out the touch signal line 106 from the right side. Then, both sides of the touch sensing chain 102 are the touch trace regions 150, that is, a gap defined between adjacent touch sensing chains 102 is the touch trace region 150.

The present invention does not specifically limit a lead-out direction of the signal line of each of the touch sensing block 103, as long as a trace layout is symmetrical about the center line 101.

The touch signal line 106 includes a horizontal section 1061 and a vertical section 1062, and the touch signal lines 106 in the display region 110 are not intersected with each other.

The vertical section 1062 is vertically connected to the horizontal section 1061, and the vertical section 1062 extends from the touch trace region 150 toward the lower border region 120.

A length of the horizontal section 1061 of the touch signal line 106 positioned far away from the lower border region 120 is greater than a length of the horizontal section 1061 of the touch signal line 106 positioned close to the lower border region 120. A length of the vertical section 1062 of the touch signal line 106 positioned far away from the lower border region 120 is greater than a length of the horizontal section 1062 of the touch signal line 106 positioned close to the lower border region 120.

Furthermore, the touch signal lines are not cross-affected, an inverted L-shaped touch signal line 106 is formed on the left side, and a pattern shape on the right side is symmetrical to the left side with respect to the center line 101.

The touch sensing blocks 103 in FIG. 2 are arranged in a matrix, with 5 rows and 4 columns, respectively. The present invention does not limit number of touch sensing blocks 103.

The present invention provides the display panel, which is connected to the touch integrated circuit through each of the touch trace regions 150 individually, and does not require all the touch trace regions 150 to be converged in the lower border region 120. Moreover, each of the touch trace regions 150 is respectively arranged above the low-voltage trace region VSS and the high-voltage trace region VDD.

The present invention replaces a concentrated layout positioned on the left and right sides of a conventional art with a distributed layout, which can reduce the width of the lower border region 120 in the left and right regions (longitudinal width B of converged region B in FIG. 2 is less than longitudinal width of converged region A in FIG. 1). This is beneficial to a narrow down border design of the large-sized display panel, and because VDD and VSS are both direct current (DC) signal sources, therefore, the present invention can also reduce the influence on the signal crosstalk.

As shown in FIG. 4, a second embodiment of the present invention provides a display panel 100a. Difference from the first embodiment is that, on the left or right side of the center line 101a, the high-voltage trace region includes at least one square portion and at least two bumps 210a. The bumps 210a are positioned on a side of the square portion away from the display region.

The bumps 210a of the lower border region 120a correspond to the bumps 210a in the bending region, and the trace-crossing region 105a is arranged above the bumps 210a.

In the display region 110a, each of the touch trace regions 150a extends longitudinally to the lower border region 120a and is converged in the lower border region 120a to form the trace-crossing region 105a. A layout density of the trace-crossing region 105a after being converged is relatively close.

Due to characteristics of the bending region, in order to prevent the layout density of the trace-crossing region 105a from being relatively close, in the second embodiment of the present invention, the trace-crossing region 105a is further divided into a third trace-crossing region 1051a and a fourth trace-crossing region 1052a. In this way, a stress concentration can be reduced. Similarly, in the trace-crossing region 105a, different film layers can also be interspersed and wired, and finally connected to the touch integrated circuit through a through hole.

The third trace-crossing region 1051a and the fourth trace-crossing region 1052a have a predetermined gap and are arranged parallel to each other.

The third trace-crossing region 1051a and the fourth trace-crossing region 1052a pass through the lower border region and are connected to the touch integrated circuit.

The third trace-crossing region 1051a and the fourth trace-crossing region 1052a are arranged above the bump 210a.

The third trace-crossing region 1051a includes a straight line portion, the fourth trace-crossing region 1052a includes a corner 111a, and the corner 111a of the fourth trace-crossing region 1052a faces the third trace-crossing region 1051a.

Furthermore, the trace-crossing regions 104a corresponding to the left and right border regions can also be split into multiple trace-crossing regions, thereby reducing a stress of the trace-crossing region 104a in the bending region.

The present invention further provides a display device, wherein the display device includes the display panel (100 or 100a) of the present invention.

In summary, embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising a display region and a border region, the border region comprising a lower border region, wherein the lower border region is positioned on a lower side of the display region, and a bending region is arranged on a side of the lower border region away from the display region;

wherein the display region comprises a plurality of touch sensing chains arranged longitudinally, and each of the touch sensing chains comprises a plurality of touch sensing blocks arranged longitudinally;

wherein each of the touch sensing chains leads to at least one touch trace region, the at least one touch trace region is arranged on a left side or a right side of each of the touch sensing chains, each of the at least one touch trace region extends longitudinally to the lower border region and is converged to form a trace-crossing region, and the trace-crossing region passes through the lower border region and the bending region to connect to a touch integrated circuit;

wherein the lower border region comprises a low-voltage trace region and a high-voltage trace region; and wherein the trace-crossing region is arranged above and overlaps with the low-voltage trace region and the high-voltage trace region, respectively, and the trace-crossing region comprises a first trace-crossing region arranged above and overlapping with the low-voltage trace region, and a second trace-crossing region arranged above and overlapping with the high-voltage trace region.

2. The display panel of claim 1, wherein a lateral width corresponding to each of the at least one touch trace region is less than a lateral width of the low-voltage trace region or a lateral width of the high-voltage trace region, and/or, a layout pattern of the trace-crossing region corresponds to a pattern of the high-voltage trace region.

3. The display panel of claim 1, wherein each of the touch sensing blocks leads out at least one touch signal line, the at least one touch signal line forms the at least one touch trace region, and in the at least one touch trace region, the at least one touch signal line extends longitudinally to the lower border region and is converged in the lower border region.

4. The display panel of claim 1, further comprising a center line, the center line being parallel to the touch sensing chains, wherein the border region further comprises a left border region and a right border region, the left border region is positioned on a left side of the display region, and the right border region is positioned on a right side of the display region, the at least one touch trace region corresponding to one of the touch sensing chains positioned on a leftmost side of the center line is arranged in the left border region, and the at least one touch trace region corresponding to one of the touch sensing chains positioned on a rightmost side of the center line is arranged in the right border region.

5. The display panel of claim 4, wherein the at least one touch signal line of the left border region and the at least one touch signal line of the right border region extend downward to the lower border region, and are converged in the lower border region to form the first trace-crossing region.

6. The display panel of claim 4, wherein the at least one touch signal line in the at least one touch trace region is symmetrical about the center line in the display region, on a left side of the center line, the at least one touch trace region corresponding to the touch sensing chains is arranged on a left side of the touch sensing chains, and on a right side of the center line, the at least one touch trace region corresponding to the touch sensing chains is arranged on a right side of the touch sensing chains.

7. The display panel of claim 4, wherein the at least one touch trace region of the display region extends longitudinally to the lower border region and is converged in the lower border region to form the second trace-crossing region.

8. The display panel of claim 7, wherein the high-voltage trace region comprises at least one square portion and at least two bumps, and the bumps are positioned on a side of the square portion away from the display region, and wherein the second trace-crossing region is divided into a third trace-crossing region and a fourth trace-crossing region, the third trace-crossing region and the fourth trace-crossing region pass through the lower border region and are connected to the touch integrated circuit, a predetermined gap is defined between the third trace-crossing region and the fourth trace-crossing region, and the third trace-crossing region and the fourth trace-crossing region are arranged above the bumps in parallel to each other.

9. The display panel of claim 8, wherein the at least one touch signal line of the left border region and the at least one touch signal line of the right border region extend downward to the lower border region, and are converged in the lower border region to form the first trace-crossing region, and wherein the first trace-crossing region comprises a straight line portion, the second trace-crossing region comprises a corner, and the corner faces the third trace-crossing region.

10. The display panel of claim 1, wherein the at least one touch signal line comprises a horizontal section and a vertical section, the at least one touch signal line in the display region is not intersected with each other, the vertical section is vertically connected to the horizontal section, and the vertical section extends from the at least one touch trace region to the lower border region.

11. A display device, comprising a display panel, wherein the display panel comprises a display region and a border region, the border region comprises a lower border region, the lower border region is positioned on a lower side of the display region, and a bending region is arranged on a side of the lower border region away from the display region;
wherein the display region comprises a plurality of touch sensing chains arranged longitudinally, and each of the touch sensing chains comprises a plurality of touch sensing blocks arranged longitudinally;
wherein each of the touch sensing chains leads to at least one touch trace region, the at least one touch trace region is arranged on a left side or a right side of each of the touch sensing chains, each of the at least one touch trace region extends longitudinally to the lower border region and is converged to form a trace-crossing region, and the trace-crossing region passes through the lower border region and the bending region to connect to a touch integrated circuit;
wherein the lower border region comprises a low-voltage trace region and a high-voltage trace region; and
wherein the trace-crossing region is arranged above and overlaps with the low-voltage trace region and the high-voltage trace region, respectively, and the trace-crossing region comprises a first trace-crossing region arranged above and overlapping with the low-voltage trace region, and a second trace-crossing region arranged above and overlapping with the high-voltage trace region.

12. The display device of claim 11, wherein a lateral width corresponding to each of the at least one touch trace region is less than a lateral width of the low-voltage trace region or a lateral width of the high-voltage trace region, and/or, a layout pattern of the trace-crossing region corresponds to a pattern of the high-voltage trace region.

13. The display device of claim 11, wherein each of the touch sensing blocks leads out at least one touch signal line, the at least one touch signal line forms the at least one touch trace region, and in the at least one touch trace region, the at least one touch signal line extends longitudinally to the lower border region and is converged in the lower border region.

14. The display device of claim 11, further comprising a center line, the center line being parallel to the touch sensing chains, wherein the border region further comprises a left border region and a right border region, the left border region is positioned on a left side of the display region, and the right border region is positioned on a right side of the display region, the at least one touch trace region corresponding to one of the touch sensing chains positioned on a leftmost side of the center line is arranged in the left border region, and the at least one touch trace region corresponding to one of the touch sensing chains positioned on a rightmost side of the center line is arranged in the right border region.

15. The display device of claim 14, wherein the at least one touch signal line of the left border region and the at least one touch signal line of the right border region extend downward to the lower border region, and are converged in the lower border region to form the first trace-crossing region.

16. The display device of claim 14, wherein the at least one touch signal line in the at least one touch trace region is symmetrical about the center line in the display region, on a left side of the center line, the at least one touch trace region corresponding to the touch sensing chains is arranged on a left side of the touch sensing chains, and on a right side of the center line, the at least one touch trace region corresponding to the touch sensing chains is arranged on a right side of the touch sensing chains.

17. The display device of claim 14, wherein the at least one touch trace region of the display region extends longitudinally to the lower border region and is converged in the lower border region to form the second trace-crossing region.

18. The display device of claim 17, wherein the high-voltage trace region comprises at least one square portion and at least two bumps, and the bumps are positioned on a side of the square portion away from the display region, and wherein the second trace-crossing region is divided into a third trace-crossing region and a fourth trace-crossing region, the third trace-crossing region and the fourth trace-crossing region pass through the lower border region and are connected to the touch integrated circuit, a predetermined gap is defined between the third trace-crossing region and the fourth trace-crossing region, and the third trace-crossing region and the fourth trace-crossing region are arranged above the bumps in parallel to each other.

19. The display device of claim 18, wherein the at least one touch signal line of the left border region and the at least one touch signal line of the right border region extend downward to the lower border region, and are converged in the lower border region to form the first trace-crossing region, and wherein the first trace-crossing region comprises a straight line portion, the second trace-crossing region comprises a corner, and the corner faces the third trace-crossing region.

20. The display device of claim 11, wherein the at least one touch signal line comprises a horizontal section and a vertical section, the at least one touch signal line in the display region is not intersected with each other, the vertical section is vertically connected to the horizontal section, and the vertical section extends from the at least one touch trace region to the lower border region.

\* \* \* \* \*